N. CRANE.
MOTOR SLEIGH.
APPLICATION FILED JULY 13, 1917.

1,308,937.

Patented July 8, 1919.
2 SHEETS—SHEET 2.

Inventor:
Newton Crane,
by Wright, Brown, Quinby & Hay
Attorneys.

UNITED STATES PATENT OFFICE.

NEWTON CRANE, OF BOSTON, MASSACHUSETTS.

MOTOR-SLEIGH.

1,308,937.  Specification of Letters Patent.  Patented July 8, 1919.

Application filed July 13, 1917. Serial No. 180,312.

*To all whom it may concern:*

Be it known that I, NEWTON CRANE, a citizen of the United States, residing at Boston, in the county of Suffolk and State of Massachusetts, have invented new and useful Improvements in Motor-Sleighs, of which the following is a specification.

The present invention relates to sleighs, sleds, and vehicles of like nature of which the supporting base is composed of runners intended for travel over ground covered with snow and ice, or over the frozen surface of bodies of water. The object of the invention hereinafter claimed is to provide runners especially useful for sleighs having the qualities of extreme rigidity to resist lateral distortion, with flexibility and resilience in the support which is afforded by such runners to the body of the sleigh. The novel features in which the invention particularly consist appear from the following detailed description in connection with the drawings showing one embodiment of such invention, and the claims appended to this specification, to which reference is directed.

In the following description and claims I have referred to the vehicle to which the invention is applied as a "sleigh" intending to include within the definition of that term as used all vehicles of whatever nature and description which are provided with runners, thus including all such vehicles or carriers of persons or goods which may be included within the ordinarily accepted meanings of "sleigh", "sled", or "sledge", and without intent to limit the invention to any particular type of vehicle having runners.

In the drawings Figure 1 is a side elevation of a motor sleigh embodying my invention.

Fig. 5 is a plan view partly in section of a detail of the driving mechanism.

Fig. 6 is a sectional view in detail of the mounting for one of the trundle rolls or wheels which is provided for supporting the sleigh on bare ground.

The same reference characters indicate the same parts in all the figures.

Figure 1:
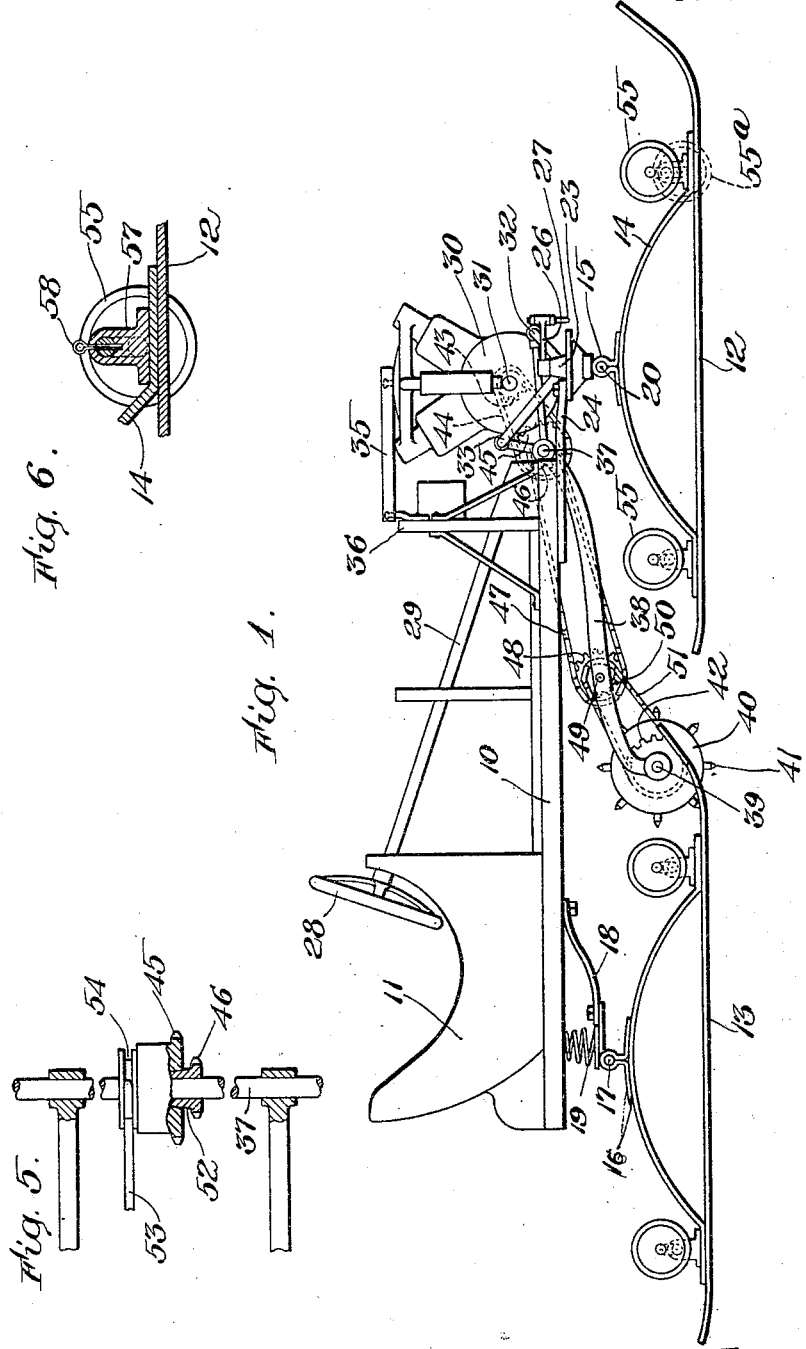

In Fig. 1 a sleigh body is represented conventionally, 10 being the floor of such body and 11 a seat for persons occupying the same. The runners are shown at 12—12, which are the forward runners, and 13—13 the rear runners. In the combination here shown all of the four runners are essentially alike and they embody the feature of the invention which I claim herein. Each runner is composed of two principal parts, namely, the body or bottom or base member, to which the distinguishing numerals 12 and 13 have been applied and the superstructure 14, the latter being an arched or bowed spring secured at its ends to the base member of the runner and adapted to be connected at a point near its center to the sleigh body. The arched upper member is of tough springy material, preferably steel, of a thickness, having regard also to its width, in proportion to the load which it is required to bear and to the extent of yield which is required or permitted under such load. At the same time such spring is relatively wide as appears from Figs. 2 and 3 whereby it has great lateral stiffness amounting practically to rigidity in that direction, from which it results that the forces and shocks encountered in the ordinary and expected use of the sleigh have no effect in twisting or displacing or otherwise distorting the runner.

The runner base member is also of relatively great width, substantially the same width as the spring, for the double purpose of providing an extended bearing surface and of adding to the lateral rigidity of the entire runner structure. The extended bearing area of course reduces the load per unit of surface of the runner to a very low figure whereby the sleigh with its load will be supported upon even light snow without sinking to any material extent therein. The runner constructed essentially as above described is exceedingly light, perfectly rigid to all practical intents and purposes laterally and at the same time gives a yielding spring support to the sleigh body. It is much lighter than any construction of sled runner with which I am acquainted, while being more rigid to resist lateral distortion than others, and its quality of resilience and ability to yield vertically is an entirely new feature in sleigh runner construction.

The runner bases are bent up at their forward ends as shown in Fig. 1 for the obvious purpose of riding over hills and humps in the surface of the snow. This part of the runner is preferably of wood, but it may be of any other material having sufficient strength and toughness to withstand the shocks and wear to which such a runner will be subjected in service.

I wish to emphasize and call particular attention to the characteristics of the runner hereinbefore described, especially its extreme lightness and its resilience. Not only is the superstructure yielding and resilient, but the base, being of tough springy wood, or equivalent material, is also resilient, besides being light in weight. The quality of resilience of course absorbs the shocks of passing over rough surfaces, the superstructure first absorbing the shock when the runner encounters a lump, ridge, or hummock of ice or frozen snow, and the base member itself yielding when passing over such a lump, particularly when its middle part between the points of connection with the superstructure rests on the lump. And the quality of light weight is of the utmost importance in a motor sleigh, of which one of the prime essentials is that the runners should rest as nearly as possible on the surface of the snow, and should not sink down to any avoidable extent. My runner, being both light and also long and wide, will not sink of its own weight to any appreciable degree even in the lightest snow, and even when bearing its part of the load caused by the sleigh body and the occupants thereof, will not sink materially. The above described qualities are obtainable in a runner of which the base is of wood and the superstructure of spring steel, when the thickness of the former is one inch or less and of the latter one-half inch or less.

In order to mount the runners on the sleigh the bowed spring portion on each is provided with an eye 15, formed conveniently out of a strap bent so as to provide a cylindrical eye and also flanges 16 which rest against and are riveted or welded or otherwise secured to the bowed spring. The rear spring is attached by this eye to a rear axle 17, or axle studs, which axle or studs may be connected with the body by straps 18 as shown in Fig. 1, and between which and the body may be also placed springs 19 for additional cushioning effect, but these parts last described may be omitted if desired and the body supported directly on the axle. Since the lateral rigidity of the runner with respect to the sleigh body depends in part on the ability of the connecting means between the runner and body to prevent relative lateral angular motion, the length of the eye, or at least the distance between the bearing ends of the eye, or its equivalent, on the axle or pivot should be a considerable amount, preferably as great as the width of the bowed spring superstructure, or even greater. As here shown the length of the eye is equal to the width of the superstructure. Provided substantially this relation between the width of the runner and the distance between the ends of its bearing on the axle pivot exists, the eye may be made otherwise than as a continuous sleeve, and may even consist of separated straps or rings if desired.

Figure 4:
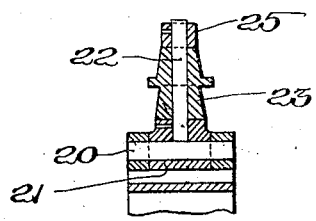
Fig. 4 is a sectional detail view of one of the connections consisting of a combination knuckle and hinge by which the forward runners are connected to the frame of the sleigh.

Each of the forward runners is connected by a hinge pintle 20 with a knuckle 21, shown in detail in Fig. 4, which has an upright shank 22 mounted to turn in a bearing 23 which is attached to an extension 24 from the forward end of the body; and to the upper end of said shank above the bearing is fixed the hub 25 of an arm 26. These arms 26 of the two forward runners are both connected to a cross connecting rod 27 and the latter is operatively connected with a steering wheel 28 and the steering post 29 in a manner such that it may be shifted to one side or the other by rotation of the wheel in a similar manner to that in which the forward wheels of a motor car are commonly turned by the steering wheel of the car. The whole steering gear thus above described is essentially the same as the common steering gear of motor cars. Any other apparatus for turning the forward runners sidewise in order to steer the sleigh may be provided if desired. The feature which I intend to set forth here is that means are provided by which the driver of the sleigh is able at will to change the direction in which the forward runners point, and thus steer the sleigh. I contemplate also mounting the rear runners in the same manner, or in any other manner permitting them to turn laterally, and connecting them with the steering gear so that they may be turned at the same time with, but oppositely to, the forward runners.

A motor is indicated as a whole at 30. Any of the motors already known and on the market may be used. It may be assumed that this motor is of the internal combustion type having two cylinders containing pistons which drive a rotary crank shaft 31; but this aspect of the invention is not limited either to an internal combustion motor or to a motor having two cylinders rather than any other number of cylinders, or to a reciprocating engine as distinguished from other types of engine. This motor is mounted upon a cradle consisting of frame members 32, 33, and 34 supported by the parts of the body frame which carry the knuckle bearings for the forward runners. The upper part of the motor is braced by a tie rod 35 connected at its opposite ends by ball and socket joints to the motor and to the dash board 36 of the sleigh body, respectively.

The cradle frame supports also a rod 37 in rear of the motor on which is hung bodily a pair of arms 38, 38 carrying a shaft 39 on which is mounted the driver or propeller of the sleigh; said driver or propeller comprising a drum or a pair of drums 40 having spikes or studs 41 projecting from their peripheries and being associated with a sprocket wheel 42. Said driver is actuated by a chain and sprocket power transmission consisting of a sprocket 43 on the motor shaft, a chain 44 passing around said sprocket and also around the sprocket 45 on the shaft 37; a sprocket 46 on shaft 37, a chain 47 passing around sprocket 46 and around a sprocket 48 on a pivot pin 49 carried by the arms 38, and a sprocket 50 connected to the sprocket 48 which drives a chain 51 passing around the sprocket wheel 42. Thus the propelling member is driven from the motor by three chains and two pairs of sprockets. The power transmission thus constituted is a step down transmission by reason of the fact that the driving sprocket for each chain is smaller than the sprocket which is driven by the chain, and also that of each two connecting sprockets 45, 46 and 48, 49, the one which is driven by a chain is larger than the one which drives the next chain; that is 45 is larger than 46 and 48 is larger than 49; whereby great power is applied by the propeller. I prefer to provide means for disconnecting the driver from the motor to the propeller, and for that purpose I have provided and arranged a break in the transmission between the sprockets 45 and 46, as indicated in Fig. 5. There is a clutch or coupling 52 between these sprockets, and the sprocket 45 is so mounted that it can be shifted axially so as to couple or uncouple this clutch. A shipper fork 53 is engaged with a groove 54 in the hub of sprocket 45 and is connected with a suitable operating means, such as a pedal, handle, or the like, accessible to the driver of the sleigh. I have not illustrated herein the operating means for this shipper because any mechanism capable of operating the same in the manner above indicated may be provided by the designer.

A feature of prime importance to which I here call particular attention, although I do not claim the same herein, resides in the mode of mounting the propeller and connecting it with the sleigh body. Several advantages result from this mode of connection, among which is that the propeller is able to sink into soft snow until it reaches a bottom firm enough to sustain the thrust which will push the sleigh ahead. The pivoted arm carrying the propeller is much longer than the vertical distance between the sleigh body and the runner base, wherefore it is possible for the propeller to sink considerably below the level on which the runners are supported. Thereby if it should happen that the snow which supports the sleigh is too light and soft to sustain the thrust of the propeller, the latter may sink and burrow into the snow while revolving until it has packed the snow firmly enough to sustain the propelling thrust, or even to the solid ground, or to ice and frozen snow beneath the top layer of light snow. The spikes 41 on the propeller are provided in such number and dimensions as to bite into packed or frozen snow, or the ground sufficiently to push the sleigh ahead against the greatest frictional resistance encountered, even that of bare ground.

Second, the propeller delivers its thrust to the sleigh body through the shaft 37 which is near the forward end of the sleigh and is also well above the point at which the propeller thrusts against the ground. Thereby the driving force is exerted forwardly and upwardly upon the forward part of the sleigh, with the resulting tendency to lift the forward runners, preventing them from becoming buried in soft snow and helping them to rise over such obstructions as snow drifts or lumps and ridges of ice and snow, and to travel up sloping surfaces.

Third, the pivot about which the propeller carrying arm swings is coincident with one of the axes of the power transmission, and the other axes of this transmission are carried by said arm, wherefore the power transmission means imposes no limit to the range of swing of the propeller, the only limits being imposed by the frame of the sleigh itself.

Figure 2:
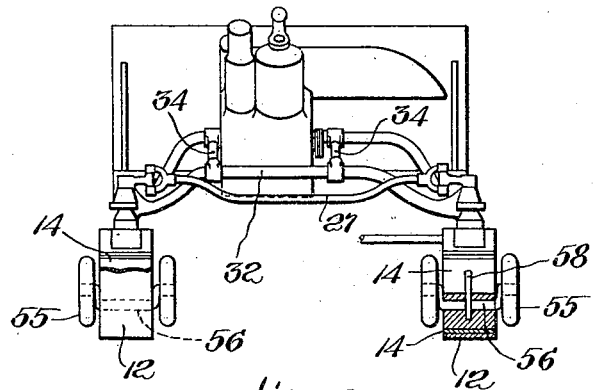
Fig. 2 is a front elevation of the forward end of the same with parts of the runners broken away and shown in section.
Figure 3:
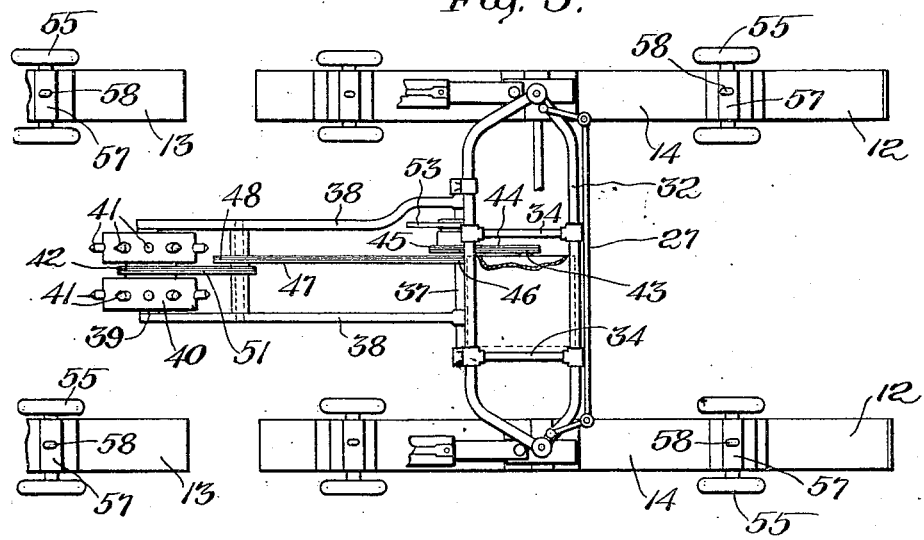
Fig. 3 is a plan view of the runners and driving gear of the sleigh, the same being represented as though the body were removed.

Another feature of the invention consists in wheels or trundle rolls 55 which I have provided in connection with the runners to support the sleigh when it becomes desirable, by reason of long stretches of bare ground, to take the weight of the sleigh from the runner bases. I have shown such trundle rolls arranged in pairs, and have mounted two pairs of such rolls on each of the runners, near the front and rear ends, respectively, thereof. As here shown all of the rolls are alike and a description of one will suffice for all. The two wheels of each pair are mounted on the pivot ends of a shaft 56, the central part of which is offset and passes through a chair 57 suitably secured to the runner. Said offset part of the shaft has a transverse hole and the chair has a socket adapted to receive a cotter pin 58. The position of the hole in the shaft is such that the cotter pin may pass through it when the shaft is turned so as either to hold the wheels elevated above the runner base as shown in Figs. 1 and 2, or when turned into the position shown in Fig. 6 and by the dotted lines 55ᵃ in Fig. 1, when the wheels project below the runner base. Thus it is a simple matter when the sleigh, after being driven over snow-covered ground arrives at a place where the ground is bare, as in traveling from the open country to a town having little or no snow on its streets, to remove the cotter pins 58 of the several wheels, reverse the position of the latter, and reinsert the cotter pins; and to reverse this proceeding upon reaching a stretch of snow-covered ground. Various modifications in this feature of the invention may be made, the essential thing being the provision of rolls or wheels associated with the sleigh in such manner that they can be either lowered to support the sleigh on the ground, or raised to allow the runners to support the sleigh; such wheels being in permanent association with the sleigh; either with the runners as shown or with some other part of the sleigh, so that they can be put readily into and out of action.

The term "ground" where used without qualification in the following claims is not limited in meaning to the solid earth but is intended to include both the solid earth or ground and the covering of snow or ice on the ground, and also the frozen surface of a body of water. In other words this term means the surface or substance on which the runners rest, and against which the propelling member of the sleigh exerts its thrust, whether the same is snow or ice or is the solid earth itself.

What I claim and desire to secure by Letters Patent is:

1. In a motor sleigh the combination with a sleigh body, motor, and propelling means, of runners which are resilient and light in weight, comprising each a base member and an upwardly bowed relatively thin and wide spring member connected at its ends to said base member and at an intermediate point to said body.

2. In a motor sleigh in combination with a body and a motor and propelling means carried by said body, of runners having wide base portions adapted to rest on the snow and having upper portions connected to said base member and to the sleigh body, which are resilient in a vertical direction and rigid laterally.

3. A sleigh runner comprising a broad base member and a spring superstructure constructed of wide thin resilient material secured immovably at its ends to the runner base, its length between points of attachment being greater than the distance in a straight line between said points, whereby its middle portion is upwardly bowed.

4. A sleigh runner comprising a broad base member and a spring superstructure constructed of wide thin resilient material secured rigidly at its ends throughout the entire width thereof to the runner base, its length between points of attachment being greater than the distance in a straight line between said points, whereby its middle portion is upwardly bowed, the relatively great width of said superstructure giving the runner substantial rigidity laterally.

5. A sleigh runner comprising essentially two members one of which is a base member and the other an arched spring superstructure fixed immovably at its opposite end portions to the base member and having means at an intermediate point for attachment to a sleigh, said members being thin for lightness and resilience, and wide for securing lateral stiffness and extended bearing area of the base member on the ground.

6. A sleigh runner comprising a base member formed as a long wide thin strip of tough material having a width greater than five inches and a thickness less than one inch, and an upwardly bowed spring superstructure connected at it sends to said base member and having means at an intermediate point for connection to a sleigh body, said superstructure being free to bend between said intermediate point and each of said points of attachment.

7. A sleigh runner comprising a base member of tough springy materal having width and length sufficient to rest, and support a substantial load, on light snow without sinking down materially, and being thin enough to spring when bearing on uneven ground, a spring superstructure of substantially the same width as said base member attached at its ends to the latter and bowed upwardly between said points of attachment, and an eye for connecting the runner to a sleigh secured to said superstructure at an elevated point thereof, the distance between the bearing ends of said eye being substantially as great as the width of the superstructure.

8. A sleigh runner comprising a base member having length and width sufficient to provide an extended bearing area and having a thickness which is but a small fraction of its width, and a superstructure of thin spring stock formed as a flat strip having a width greatly exceeding its thickness, and being secured at its ends to said base member in a rigid manner preventing tilting or sliding of such ends in any direction with respect to the base member, the length of said superstructure being greater than the distance between the points at which its ends are attached to the base member, whereby it is upwardly bowed, and attaching means on said upwardly bowed part for connecting the same with a vehicle body; the superstructure being free to yield at all points between said attaching means and each of its ends.

9. A sleigh runner comprising a base member having length and width sufficient to provide an extended bearing area and having a thickness which is but a small fraction of its width, and a superstructure of thin spring stock formed as a flat strip having a width greatly exceeding its thickness, and being secured at its ends to said base member in a rigid manner preventing tilting or sliding of such ends in any direction with respect to the base member, the length of said superstructure being greater than the distance between the points at which its ends are attached to the base member, whereby it is upwardly bowed, and attaching means on said upwardly bowed part for connecting the same with a vehicle body; the extreme limits of said attaching means being substantially coextensive with the width of the superstructure, whereby the runner is prevented from tilting laterally with respect to the sleigh.

In testimony whereof I have affixed my signature.

NEWTON CRANE.

Copies of this patent may be obtained for five cents each, by addressing the "Commissioner of Patents, Washington, D. C."